Dec. 9, 1958 — G. S. KNOX — 2,863,629
VALVE
Filed Aug. 2, 1956 — 4 Sheets-Sheet 1
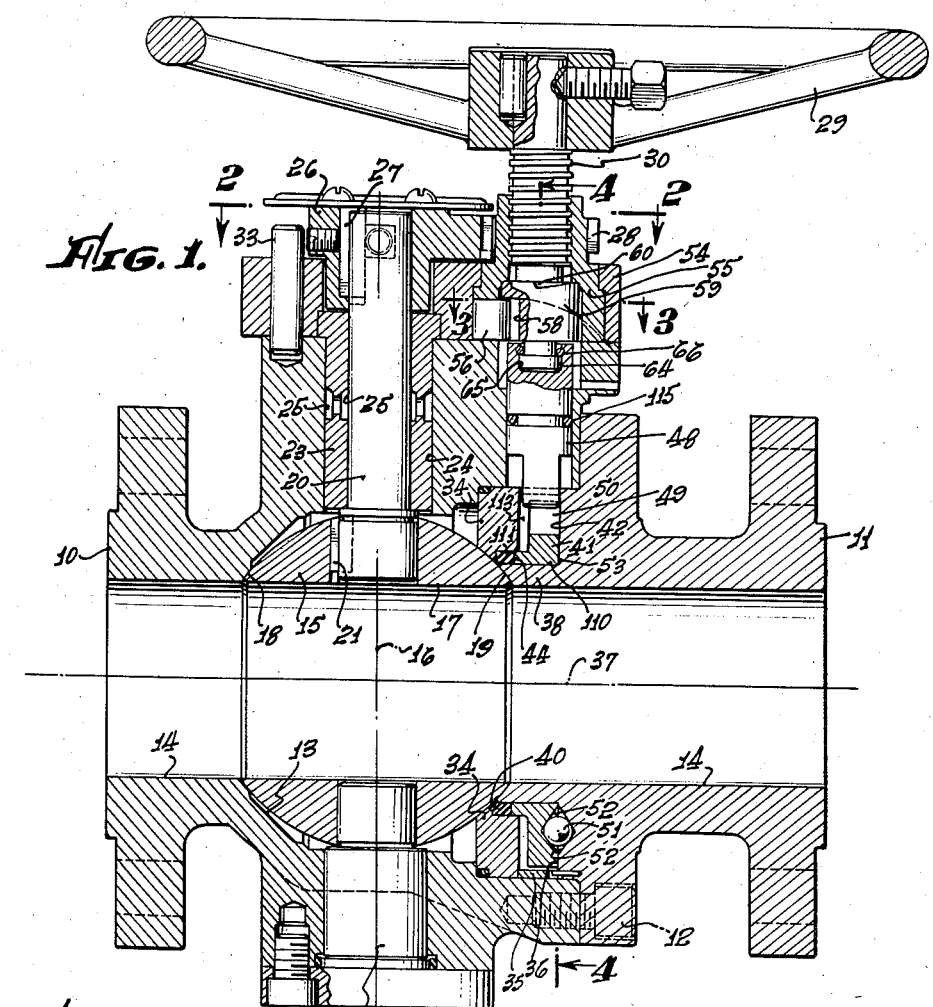
Fig. 1.
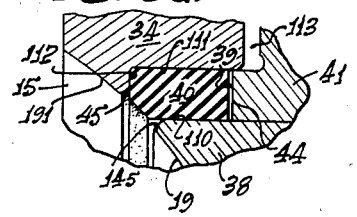
Fig. 6a.
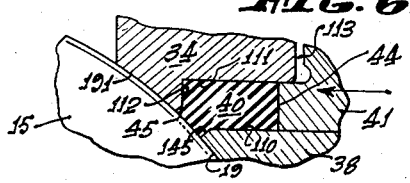
Fig. 6b.
Fig. 6c.
GRANVILLE S. KNOX
INVENTOR.
ATTORNEY.

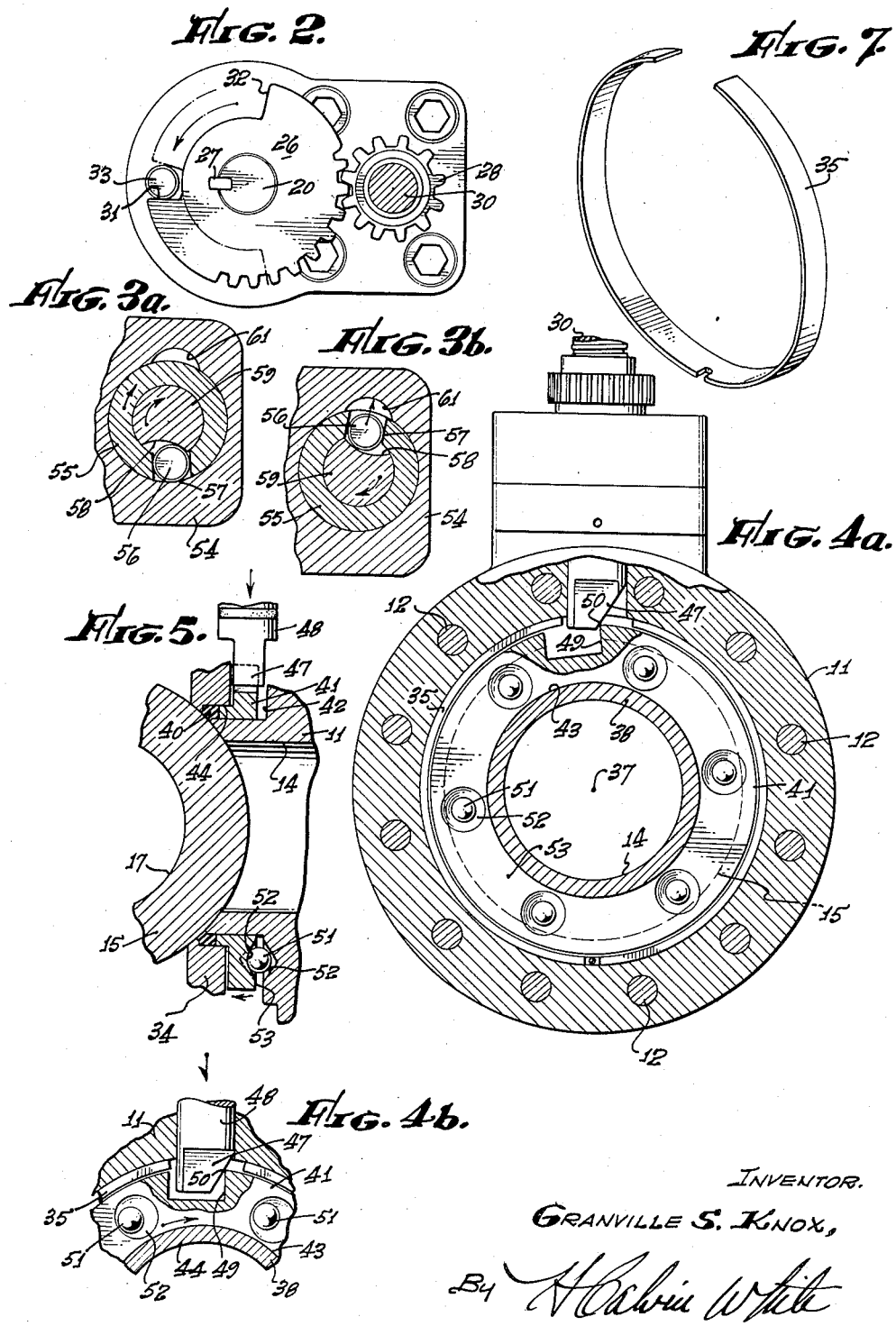

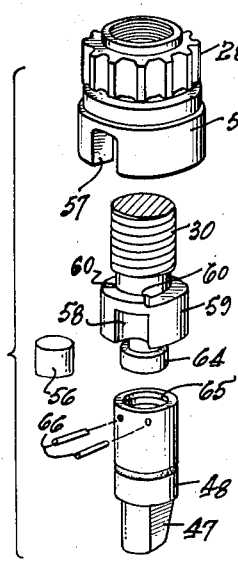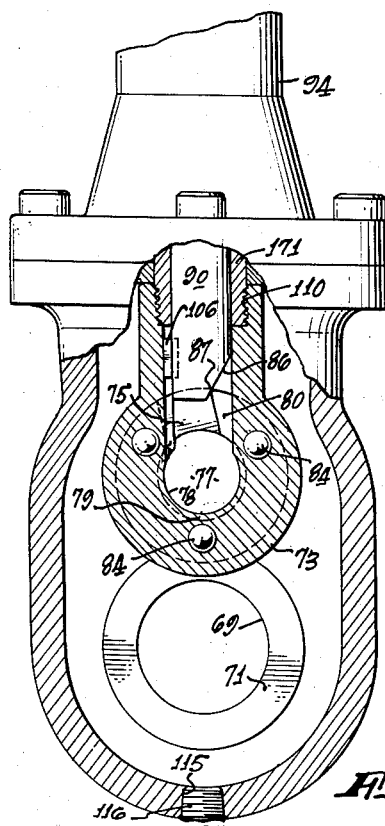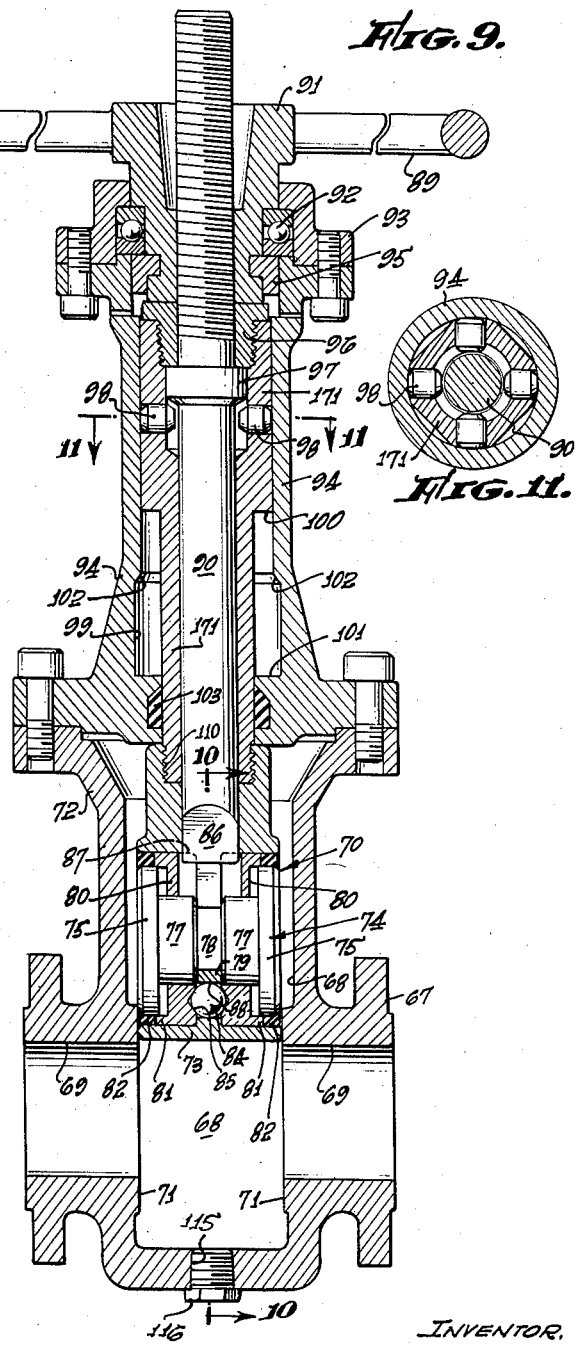

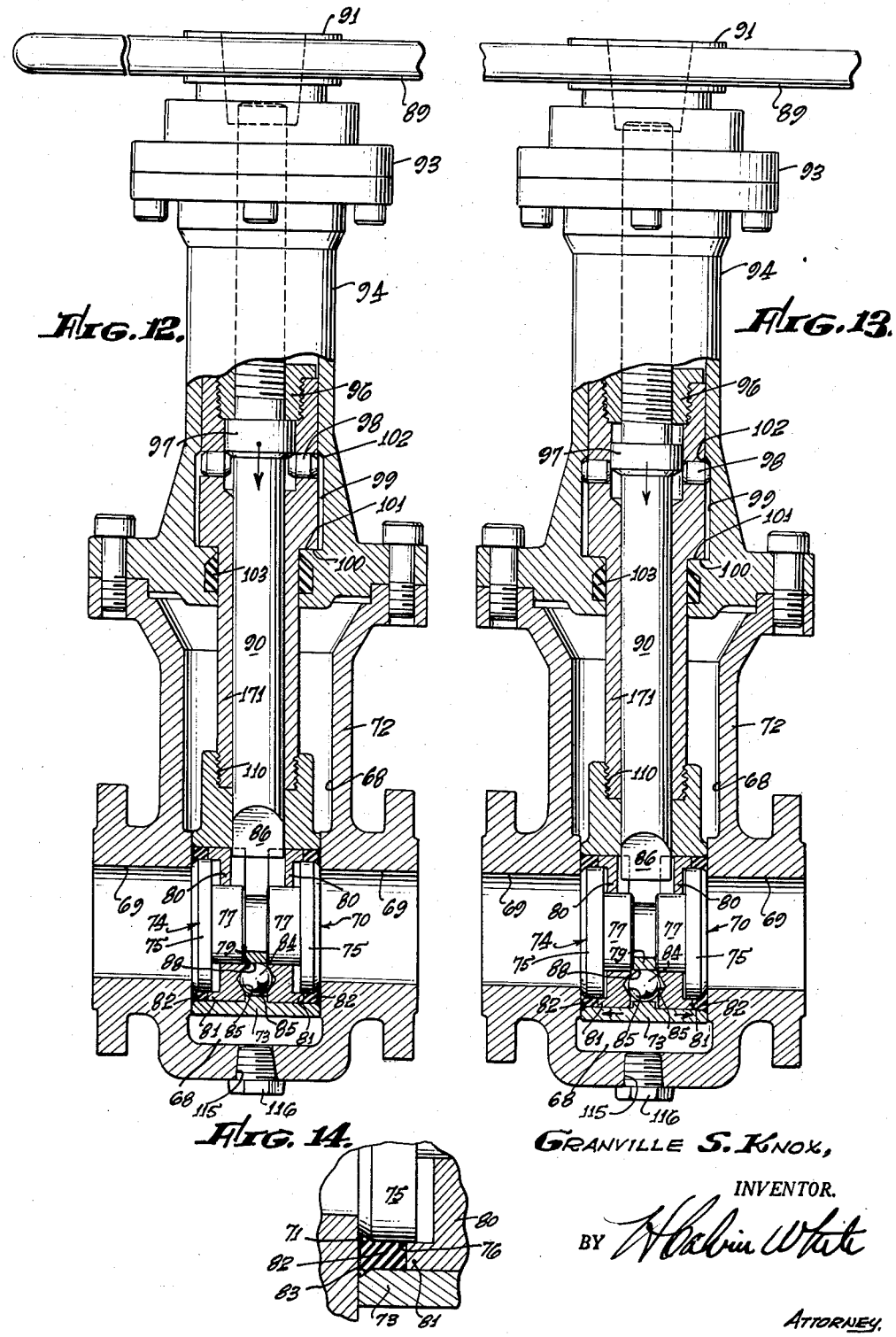

United States Patent Office 2,863,629
Patented Dec. 9, 1958

2,863,629

VALVE

Granville S. Knox, Glendale, Calif., assignor to Hydril Company, Los Angeles, Calif., a corporation of Ohio Application August 2, 1956, Serial No. 601,771

18 Claims. (Cl. 251—171)

This invention relates generally to the sealing of valves against fluid pressure, and more particularly has to do with the establishment and maintenance of a positive, enduring, bubble-tight and seep-proof seal against high pressure gases and liquids under unusually severe operating conditions, the sealing action being effective to prevent escape of fluid not only from one side of the stopper to the other but also to the valve exterior and to internal mechanical parts by the operation of which the valve is advantageously closed and sealed in sequence.

In the past many attempts have been made to produce tightly sealing valves by resorting to such expedients as super finishes on relatively movable metal-to-metal valve components and tightly wedging metal-to-metal fits, as well as the application of highly viscous lubricants to movable parts between which a seal is to be effected; however, while such aids enable a conventional valve to effect a seal when it is new and the fluids handled are clean and free from sediment, prolonged hard usage roughens polished metal surfaces, sediment deposition prevents tight fits between metal parts and viscous lubricants gradually escape from sealing areas to disperse within the fluid system. Where natural or synthetic rubber seals are made use of, they are attacked or otherwise subject to swelling after prolonged contact with certain acids, alkalies, solvents and aromatic hydrocarbons, and the valves may then stick and become impossible to operate at least by hand. Furthermore, such seals lose their stability at temperatures below about —30° F. and above approximately 250° F.

With the above problems associated with conventional valve operation in view, it is a major object of the present invention to provide a valve the seep-proof sealing ability and hand operation of which are not seriously impaired by prolonged hard usage, severe abrasions and even rusting of metal parts, and without requiring the use of super finishes and wedging fits of metal parts and viscous sealing lubricants. All this is accomplished by providing first of all a seal comprising internally tenacious, relatively rigid inert material that extends about a portion of the valve chamber through which the flow is obstructed or blanked by the stopper, and which is carried for bodily displacement into positive sealing engagement with the stopper and valve structure forming the chamber after the stopper is in blanking position. Pressure is exerted on the seal holding it in confined and uniform pressure transmitting engagement with the stopper and valve structure to seal off therebetween by a member bodily movable to displace and exert pressure on the seal in response to continued operation of a valve control beyond the point corresponding to closed or flow blanking condition of the stopper. As a result, the seal cannot be damaged as by accidental pressurization thereof while the stopper is in partially closed or open condition, it remains confined during pressurization with minimum tendency to extrude out through small clearances, and it adjusts itself in its compressed condition to transmit uniform sealing pressure to the stopper and surrounding body structure.

Furthermore, the seal is desirably mounted for a press or sealing fit with the walls of the cavity housing the seal and the efficiency of this seal is maintained when the valve is in open position by providing for wedging the seal more tightly in the cavity as it is acted upon by fluid pressure within the valve chamber to prevent entrance of fluid into the cavity beyond the seal and into contact with the mechanical parts operable to bodily displace the seal in the manner described. Thus these operative elements remain in a clean, well lubricated condition ensuring long, trouble-free valve life even when fluids containing abrasive or corrosive elements are handled.

The above referred to parts which function to bodily displace the packing are designed for operation with minimum frictional resistance during the sealing operation and also to insure a positive reversal or relaxation of the sealing action, providing for hand operation of the valve with least effort; for this purpose, a combination of low friction camming elements and part movements novel to valve sealing systems is designed for interaction to effect displacement of the valve packing.

The unique anti-friction camming elements can be readily adapted to provide the proper degree of thrust against the packing, and the use of anti-friction cam rollers makes possible the use of very low cam angles without danger of the camming mechanism becoming self-locking. This is important because relatively low cam angles must be used to provide the amount of thrust necessary to seal the valve against very high fluid pressures.

Representative sealing materials best adapted for use in the present valve comprise such compositions as molded tetrafluoroethylene and asbestos, although other inert relatively rigid substances capable of bodily displacement under pressure, as distinguished from plastic flow, are capable of effecting the desired sealing action.

The invention contemplates the provision not only of a single sealing element embodying the above described advantages, but also of a double seal each by itself incorporating these features so that the two may operate together simultaneously to seal off the stopper chamber inlet and outlet, thereby improving the overall operating efficiency of the valve.

Other features and objects of the invention, as well as the details of an illustrative embodiment, will be more fully understood from the following detailed description of the drawings, in which:

Fig. 1 is a vertical section taken through the valve assembly;

Fig. 2 is a plan view taken on line 2—2 of Fig. 1;

Figs. 3a and 3b are sections taken on line 3—3 of Fig. 1;

Fig. 4a is a vertical section taken on line 4—4 of Fig. 1;

Fig. 4b is a fragmentary section similar to Fig. 4a;

Fig. 5 is a vertical fragmentary section illustrating the pressure sealing action of the valve components;

Figs. 6a, 6b and 6c are enlarged fragmentary sections showing open and closed positions of the sealing valve components;

Fig. 7 is a perspective showing of the spacer illustrated in Figs. 1 and 4;

Fig. 8 is an exploded view of the valve parts operable to control sealing action;

Fig. 9 is a vertical section through a modified form of valve incorporating the invention;

Fig. 10 is a section taken on line 10—10 of Fig. 9;

Fig. 11 is a section taken on line 11—11 of Fig. 9;

Fig. 12 is a vertical section through the valve similar to Fig. 9 but showing an intermediate stage in valve operation;

Fig. 13 is another section similar to that of Fig. 9 showing the valve parts in closed and sealed condition; and Fig. 14 is an enlarged fragmentary section showing the disposition of the seal when it is not engaged with the valve body.

As shown in Fig. 1, the assembly includes a flanged body 10 and a flanged body cap 11 connected by cap screws 12 and together forming a valve chamber 13 having coaxial inlet and outlet passages 14 in communication therewith. A valve stopper 15 in the general form of a spherical plug is positioned in the chamber for rotation therein about a vertical axis 16 through horizontal passage 17 in the stopper into and out of registration with horizontal passages 14 for controlling fluid flow through the valve.

In general, there is a slight clearance between the stopper surface and the faces 18, 19 and 191 of the body parts forming the chamber 13 so that the stopper may be turned inside the chamber by rotation of the vertical spindle 20 to which it is keyed at 21. A stopper trunnion 22 extending vertically and coaxially with the spindle pivotally mounts the stopper for rotation.

The spindle 20 is centered by a bushing 23 received within a vertical bore 24 in body 10 and contains a pair of annular recesses 25 filled with plastic packing injected under pressure to seal off between the bushing and the spindle and also between the bushing and the bore 24. The spindle projects upward through the bushing and into a gear segment 26 meshing with the pinion 28 rotated by handwheel 29 through screw shaft 30 as will be described. Thus, as seen in Figs. 1 and 2, clockwise rotation of the handwheel effects counterclockwise rotation of the segment displacing segment shoulders 31 and 32 respectively away from and toward a stop pin 33 and also turning the stopper counterclockwise so that its passage 17 turns out of communication with the inlet and outlet passages 14 followed by engagement of the segment shoulder 32 with the stop pin. Conversely counterclockwise rotation of the handwheel rotates the stopper to open position at which time the segment shoulder 31 engages the stop pin.

Body 10 also mounts an annular retainer 34 held in position by a spacer ring 35 extending between the retainer and the face 36 of the body cap 11, both the retainer and the ring being mounted coaxially with the common axis 37 of passages 14.

The outer surface 110 of annular portion 38 of the body cap 11 together with bore 111 and end shoulder 112 of the retainer 34 define an annular cavity 39 extending about passages 14 and 17 and adjacent the stopper surface, and a packing annulus 40 formed of internally tenacious relatively rigid packing material, preferably comprising an inert substance such as molded tetrafluoroethylene or asbestos, is mounted in the cavity with a press or sealing fit between and against surfaces 110 and 111 as better shown in Figs. 6a through 6c. For bodily displacing the packing into sealing engagement with the stopper surface with uniform pressure, an annular thrust ring 41 is mounted in a space 113 between the retainer 34 and the face 42 of the body cap 11 for rotation about cylindrical outer surface 110 of the annular body cap portion 38, the thrust ring including an annular boss or tongue 44 received within the cavity and acting with the retainer, body cap portion 38 and the stopper to substantially confine the packing in the cavity when the packing is in sealing engagement with the stopper.

As shown in Fig. 6a, when the packing annulus 40 is first pressed in the cavity 39, it does not entirely fill the cavity mouth formed between bevels 45 and 145 on the retainer and the body portion 38. However, as the thrust ring tongue 44 moves into the cavity and into engagement with the packing, bodily displacing it first against shoulder 112 of retainer 34 and then toward the stopper, the packing material is deformed and pushed into the cavity mouth to fill the latter and press against the stopper surface forming a seal between the stopper, retainer and body portion 38 as seen in Fig. 6b. Thereafter, when sealing pressure on the thrust ring is relieved, the relatively rigid and somewhat elastic packing material tends to be retracted bodily away from the stopper by pressural contact with shoulder 112 and any fluid pressure within the valve chamber assists in bodily moving the packing away from the stopper since the space 113 remains at atmospheric pressure; however, that portion of the packing which was pushed into the cavity mouth tends to retain some of its thickened end shape and therefore tends to maintain a press or sealing fit with walls 111, 145, and 110 to seal off the cavity 39 from fluids leaking between the stopper and the retainer and body portion 38 as the valve is opened, as seen in Fig. 6c. As a result, fluids cannot enter the cavity and come in contact with the thrust ring and other mechanical parts to be described.

The thrust ring is urged into engagement with the packing for sealing purposes by the anti-friction camming elements that will now be described with reference to Figs. 1, 4 and 5. Rotation is transmitted to the thrust ring by downward movement of the cam 47 projecting downward from plug 48 into the space between the retainer 34 and body cap face 42 and into a recess 49 formed in the thrust ring, the cam surface engaging a lip 50 of the thrust ring for rotationally displacing the latter about axis 37 when the cam is moved downward to the position shown in Fig. 4b. This rotary movement of the thrust ring is accompanied by axial bodily displacement thereof into engagement with the packing ring as a result of the camming action of a plurality of balls 51 carried in opposite conical recesses 52 circularly spaced about axis 37 and formed in opposite faces 42 and 53 of the body cap 11 and thrust ring 41. As seen in Figs. 1 and 4a, prior to downward displacement of the cam 47, the balls are centered in the recesses so that the thrust ring is in an axial position close to the face 42 of body cap 11. However, as the cam 47 is displaced downwardly, the balls 51 which are in the path of ring rotation, and which engage the walls of recesses 52 angled in the direction of thrust ring rotation and axial advancement toward the packing, roll up the inclined recess walls substantially without friction to displace the thrust ring axially toward the packing as it rotates, as shown in Figs. 4b and 5. Since the packing at all times seals off the space 113 from entrance of fluids, the latter cannot come in contact with the thrust ring, the cam 47 or the balls 51 located in space 113, so that all these elements may be lubricated for minimum friction camming action without danger of contamination of the lubricant.

In describing the mechanical action sequentially operable to close the stopper, thrust the packing into sealing engagement therewith, and thereafter to relieve the thrust against the packing and to open the stopper, all of these functions being accomplished by merely rotating the handwheel 29, reference will be made to Figs. 1 through 3. Mounted for rotation in the cover plate 54 is the hub 55 of pinion 28, the hub being coaxial with the screw shaft 30, the pinion and its integral hub being threaded on the shaft 30. As shown in Figs. 1 and 3a, the hub and shaft are interlocked against relative rotation at all times except when the stopper is fully closed, by the roller 56 extending in a radial slot 57 formed in the hub and into a concave recess 58 cut into a flanged portion 59 of the shaft opposite the slot, the roller engaging the concave inner wall of the recess and the slot wall to provide the desired interlocking action. Additional one-way interlocking action during counterclockwise rotation of the handwheel is provided by abutting engagement of opposed upwardly inclined shoulders 60 cut into the hub and the flanged portion of the shaft within the hub without producing a wedging fit which might be difficult to break.

Inasmuch as the shaft 30 and pinion are initially interlocked by the roller 56, clockwise rotation of the handwheel operates through the mechanism described to rotate the stopper to closed position, at which point further stopper rotation is prevented by engagement of face 32 of the segment 26 with the stop pin 33 as shown by the broken lines in Fig. 2, thereby interrupting further rotation of the pinion 28. However, by this time the screw shaft and hub have been rotated to the position shown in Fig. 3b with the slot 57 opening to a notch 61 cut sufficiently into the cover plate, so that the roller can be displaced into the notch by relative rotation of the screw shaft within the hub acting to cam the roller out of interlocking relation with the shaft and hub. Thereafter, the screw shaft is freely threaded downwardly to displace the plug 48 and the cam 47 downward, which imparts rotational and axial movement to thrust ring 41 resulting in the exertion of uniform sealing pressure of the packing against the stopper.

Upon counterclockwise rotation of the handwheel, the screw shaft is threaded upwardly in the integral hub and pinion until the opposed shoulders 60 formed in the flanged portion 59 of the shaft and in the hub come into engagement at which point the shaft begins to rotate the hub and pinion counterclockwise. Since the concave recess 58 in the flange is then opposite the slot 57 in the hub, counterclockwise rotation of the hub relative to the notch 61 in the cover plate operates through the camming action of the notch to displace the roller radially inwardly to its original position interlocking the shaft and pinion. Thereafter, further counterclockwise rotation of the handwheel rotates the stopper to open condition.

As regards the connection of screw shaft 30 with the plug 48, a T-head 64 depends from the screw shaft flange 59 into a bore 65 in the plug, and a pair of transverse pins 66 carried by the plug retain the T-head in abutment against the inner face of the bore. As a result, up and down displacement of the T-head carries the plug with it while the pins accommodate a certain amount of misalignment between the plug and screw shaft so as to prevent binding during movement thereof. A seal ring 115 is mounted on plug 48 to seal cavity 113 against the entrance of dirt or moisture from outside the valve.

In the modified valve form shown in Figs. 9 through 14 the body 67 forms a vertically elongated valve chamber 68 and a pair of coaxial inlet and outlet passages 69 communicating with the chamber at opposite sides thereof, the chamber being sized to receive a stopper assembly 70 with a slight clearance between the opposite sides of the assembly and the chamber wall portions 71 bounding the passages 69 opening into the chamber.

The stopper assembly, which is moved up and down in the chamber by a sleeve 171 projecting upwardly through the body portion 72 includes a ring-shaped carrier 73 into which the sleeve is threaded at 110. The carrier supports a pair of flanged cylinders indicated at 74 having annularly chamfered end flanges 75, the outer sides of which together with those of the carrier form the sides of the stopper assembly, the flange circumferences being spaced from the inside of the carrier ring to form a cavity 76 therebetween as better seen in Fig. 14. The cylinders 74 also include a pair of symmetrically spaced cylindrical sections 77 separated by an inwardly projecting flanged portion 79 of the carrier, the latter holding the cylinders 74 against endwise play in the carrier so that the outer faces of the flanges 75 remain flush with the sides of the carrier.

Mounted for axially opposite sliding movement on the cylindrical sections 77 are a pair of annular thrust rings 80 that include annular tongues 81 received within the cavities 76 for displacing the packing material 82 extending annularly therein with a press fit against the carrier and flanges. As described above, the packing may comprise an internally tenacious relatively rigid inert substance such as molded tetrafluoroethylene or asbestos having the capacity for bodily displacement into sealing engagement with the chamber walls 71 under the displacing action of the tongues 81 as shown in Figs. 13 and 14. Once the material has been initially extruded into the wedge shaped cavity mouth 83, formed by annular chamfers on the carrier and flanges 75, under sufficient pressure to fill the mouth and seal against the chamber wall, it will tend to retain some of its wedge shape upon the release of thrust exerted by the ring through the tongue so as to seal against the wedge-shaped cavity mouth wall and thereby seal off the cavity from fluids in the chamber 68, preventing damage as by corrosion to the thrust rings and other operating mechanism to be described.

The two thrust rings are separated by a number of balls 84 contained within passages 88 drilled in the carrier between the opposite conical recesses 85 formed in the opposed inner faces of the thrust rings. When the thrust rings are rotated together about the cylindrical sections 77 by downward displacement of the cam 86 engaging the lips 87 of the rings, the inclined walls forming the recesses 85 are rotated against the balls 84 so that the thrust rings are axially oppositely thrust into engagement with the packing rings to seal the valve, as shown in Fig. 13. Conversely, as the cam 86 is retracted upwardly in the sleeve 171 the thrust rings readjust themselves by rotating backward until the recesses 85 are opposite the balls and the pressure against the packing is relieved, thereby unsealing the valve.

The description will now be extended to the upper portion of the valve assembly and particularly to the structure operable to displace the sleeve 171 and the cam 86 independently and in sequence so that valve sealing action can never take place until stopper assembly 70 is in position blanking the inlet and outlet passages 69, these separate functions occurring automatically merely as a result of continued rotation of the handwheel 89 at the top of the valve. As shown in Figs. 9, 12 and 13, the cam 86 is formed on a vertically elongated rod 90 the upper end of which is threaded for vertical displacement by rotation of the handwheel hub 91. The latter is mounted for rotation without axial displacement by the ball bearing 92 positioned by a cap 93 connected to the bonnet 94 and by a split locking ring 95 engaging the hub as shown in Fig. 9. The hub 91 limits upward travel of another nut 96 threaded into the upper end of the sleeve 171 so as to limit upward travel of the stopper assembly connected to the sleeve. Also, nut 96 limits upward travel of the integral thrust collar 97 on the rod 90 so as to limit upward displacement of cam 86 with respect to the thrust rings 80.

Clockwise rotation of the hand wheel 89 causes the rod 90 to thread downwardly in the hub 91, and when the collar 97 engages the radial detents 98 in the sleeve the latter is carried downwardly with the rod to displace the stopper assembly into passage blanking position as shown in Fig. 12. By this time, the detents 98 are brought opposite the counterbore 99 in the bonnet so that further downward travel of the rod collar 97 cams the detents radially outwardly sufficiently to pass the collar downwardly therebetween, allowing the cam 86 to actuate the thrust rings. Such downward travel of the rod 90 occurs independently of the sleeve since a shoulder portion 100 of the latter seats against the bonnet shoulder 101 spaced above body portion 72. Also the rod is prevented from rotating by engagement of end mounted key 106 in a carrier keyway shown in Fig. 10, the carrier being held against rotation by engagement with the chamber wall portions 71.

When the handwheel is rotated counterclockwise, the rod 90 is lifted in the sleeve, relieving the pressure on the thrust rings, and when the collar 97 engages the nut 96, the sleeve is then lifted with the rod and the detents cam inwardly under the collar as the detents are lifted by the sleeve past the counterbore shoulder 102.

Plastic packing 103 is injected into an annular channel in the bonnet 94 and around sleeve 171 to prevent escape of fluid from chamber 68.

After stopper assembly 70 has been closed and sealed drain passage 115 may be opened by removing plug 116 to release all fluid from chamber 68 so as to establish an air gap between passages 69 thereby providing against the possibility that different fluids in the two passages might intermingle or contaminate one another in the event the packings were not compressed tightly enough to stop all seepage.

I claim:

1. In a valve, an assembly including a body member forming a chamber having inlet and outlet passages for flowing fluid therethrough and a stopper member movable into and out of flow blanking closed position within the chamber, one of said members forming a cavity extending about a chamber flow zone and being blanked by said other member when the stopper is in said closed position, internally tenacious packing material in the cavity, means including a thrust ring movable to transmit pressure acting against one face of the packing for thrusting the packing opposite face toward and into sealing engagement with said other member when the stopper is in said closed position, and a control actuable to move the stopper to closed position and thereafter to move said first means to transmit said pressure in response to actuation of said control.

2. In a valve, an assembly including a body member forming a chamber having inlet and outlet passages for flowing fluid therethrough and a stopper member movable into and out of flow blanking closed position within the chamber, one of said members forming an annular cavity encircling a chamber flow zone and being blanked by said other member when the stopper is in said closed position, internally tenacious packing material in the cavity, means including a thrust ring facing the cavity and movable to transmit pressure acting against one annular face of the packing for thrusting the packing opposite face toward and into sealing engagement with said other member, said packing faces encircling said zone when the stopper is in said closed position, and a control actuable to move the stopper to closed position and thereafter to move said first means to transmit said pressure in response to actuation of said control.

3. In a valve, an assembly including a body member forming a chamber having inlet and outlet passages for flowing fluid therethrough and a stopper member movable into and out of flow blanking closed position within the chamber, one of said members forming an annular cavity encircling a chamber flow zone and being blanked by said other member when the stopper is in said closed position, internally tenacious packing material in the cavity, means including a thrust ring facing the cavity and movable to transmit pressure acting against one annular face of the packing for thrusting the packing opposite face toward and into sealing engagement with said other member, said packing faces encircling said zone when the stopper is in said closed position, and a control actuable to move the stopper to closed position and thereafter to move said first means to transmit said pressure in response to actuation of said control, said first means including anti-friction camming through which said pressure is transmitted to said thrust ring.

4. In a valve, an assembly including a body member forming a chamber having inlet and outlet passages for flowing fluid therethrough and a stopper member movable into and out of flow blanking closed position within the chamber, one of said members forming an annular cavity encircling a chamber flow zone and being blanked by said other member when the stopper is in said closed position, internally tenacious packing material in the cavity, means including a thrust ring facing the cavity and rotatable to transmit pressure acting against one face of the packing for thrusting the packing opposite face toward and into sealing engagement with said other member, said packing faces encircling said zone when the stopper is in said closed position, and a control actuable to move the stopper to closed position and thereafter to move said first means to transmit said pressure in response to actuation of said control, said first means including anti-friction camming engaging said thrust ring and through which said pressure is transmitted upon rotation of said thrust ring.

5. In a valve, an assembly including a body member forming a chamber having inlet and outlet passages for flowing fluid therethrough and a stopper member movable into and out of flow blanking closed position within the chamber, one of said members forming an annular cavity encircling a chamber flow zone and being blanked by said other member when the stopper is in said closed position, internally tenacious packing material in the cavity, means including a thrust ring facing the cavity and movable to transmit pressure acting against one face of the packing for thrusting the packing opposite face toward and into sealing engagement with said other member, said packing faces encircling said zone when the stopper is in said closed position, and a control actuable to move the stopper to closed position and thereafter to move said first means to transmit said pressure in response to actuation of said control, said members and first means acting to confine the packing against fluid pressure dislodgement from said cavity when said packing opposite face is in pressure sealing engagement with said other member.

6. In a valve, an assembly including a body member forming a chamber having inlet and outlet passages for flowing fluid therethrough and a stopper member movable into and out of flow blanking closed position within the chamber, one of said members forming an annular cavity encircling a chamber flow zone and being blanked by said other member when the stopper is in said closed position, an annulus of internally tenacious packing material in the cavity, means including a thrust ring carried by said assembly and movable to transmit pressure acting against one face of the packing annulus for thrusting the packing opposite face into sealing engagement with said other member, said packing faces encircling said zone when the stopper is in said closed position, and a control actuable to initially move the stopper to closed position and thereafter to move said first means to transmit said pressure in response to continued actuation of said control.

7. The invention as defined in claim 6 in which said packing comprises a molded plastic material.

8. The invention as defined in claim 6 in which said packing comprises tetrafluoroethylene.

9. The invention as defined in claim 6 in which said thrust ring is mounted by the assembly for bodily movement coaxially with and toward the packing annulus.

10. The invention as defined in claim 9 in which said thrust ring is rotatable about said axis during said movement thereof in response to said control operation.

11. The invention as defined in claim 10 in which said means includes an anti-friction cam element in the path of ring rotation for engaging and axially bodily moving the ring during said rotation thereof.

12. The invention as defined in claim 11 comprising a plurality of balls, and in which said ring has spaced shoulder portions angled in the direction of said ring axial displacement and rotation and engaged by said balls.

13. The invention as defined in claim 12 including another cam element movable to engage and rotate said ring in response to said control operation.

14. The invention as defined in claim 9 comprising a plug stopper rotatable in said chamber, and in which said packing is carried in a cavity formed in said body member for displacement into and out of sealing engagement with the stopper.

15. The invention as defined in claim 9 comprising a gate stopper reciprocable in said chamber, and in which said packing is carried in a cavity formed in the stopper for displacement into and out of sealing engagement with said body member.

16. The invention as defined in claim 15 comprising a pair of axially spaced cavities formed in opposite sides of the stopper and packing annuli extending therein for engagement with opposite chamber walls bounding said passages.

17. The invention as defined in claim 11 in which said packing is mounted in relatively tight fitting sealing relation with the cavity wall to seal off said thrust ring from contact by fluid in the flow passages.

18. The invention as defined in claim 17 in which a portion of said cavity is relatively widened so that said wall seats the packing with increased sealing tightness in response to application to the packing of flow pressure tending to displace the packing in the cavity toward said thrust ring.

References Cited in the file of this patent

UNITED STATES PATENTS

| | | |
|---|---|---|
| 2,708,094 | Heinen | May 10, 1955 |
| 2,734,714 | Knox | Feb. 14, 1956 |
| 2,734,715 | Knox | Feb. 14, 1956 |